US008301307B2

(12) United States Patent
Paulus et al.

(10) Patent No.: US 8,301,307 B2
(45) Date of Patent: Oct. 30, 2012

(54) PNEUMATIC ACTUATOR SYSTEM AND METHOD

(75) Inventors: Heinz Theo Paulus, Xanten (DE); Florain Braun, Ostfildern (DE); Frank Schnur, Boennigheim (DE); Norbert Giesen, Geldern (DE)

(73) Assignee: Norgren GmbH, Alpen (DE)

( * ) Notice: Subject to any disclaimer, the term of this patent is extended or adjusted under 35 U.S.C. 154(b) by 287 days.

(21) Appl. No.: 12/594,638

(22) PCT Filed: Apr. 13, 2007

(86) PCT No.: PCT/EP2007/003291
§ 371 (c)(1), (2), (4) Date: Oct. 5, 2009

(87) PCT Pub. No.: WO2008/125132
PCT Pub. Date: Oct. 23, 2008

(65) Prior Publication Data
US 2010/0121496 A1 May 13, 2010

(51) Int. Cl.
*G05D 11/00* (2006.01)

(52) U.S. Cl. ........................ 700/282; 700/301; 91/189 A

(58) Field of Classification Search .................... 700/13, 700/45, 63, 175, 252, 282, 301, 302; 91/178, 91/189 A, 361, 364
See application file for complete search history.

(56) References Cited

U.S. PATENT DOCUMENTS

| | | | | |
|---|---|---|---|---|
| 3,991,661 | A | 11/1976 | Mocha | |
| 4,471,614 | A | 9/1984 | Hart | |
| 5,068,779 | A | 11/1991 | Sullivan et al. | |
| 5,125,326 | A | 6/1992 | Sarcona | |
| 5,165,322 | A | 11/1992 | Moody | |
| 5,201,838 | A | 4/1993 | Roudaut | |
| 5,377,488 | A | 1/1995 | Malina | |
| 5,381,661 | A | 1/1995 | Malina | |
| 5,424,941 | A | 6/1995 | Bolt et al. | |
| 5,836,161 | A | 11/1998 | Malina | |
| 5,943,862 | A | 8/1999 | Malina | |
| 6,457,369 | B1 | 10/2002 | Petersen | |
| 6,705,199 | B2 * | 3/2004 | Liao et al. | 91/363 R |
| 7,145,097 | B2 | 12/2006 | Leach et al. | |
| 7,493,993 | B2 * | 2/2009 | Pettersson | 188/72.9 |
| 2004/0173578 | A1 | 9/2004 | Leach et al. | |
| 2006/0037466 | A1 | 2/2006 | Yajima et al. | |

FOREIGN PATENT DOCUMENTS

| | | | |
|---|---|---|---|
| CN | 1737381 | A | 2/2006 |
| EP | 0867271 | A2 | 9/1998 |
| EP | 1396642 | A1 | 3/2004 |

* cited by examiner

*Primary Examiner* — John R. Cottingham
*Assistant Examiner* — Chad Rapp
(74) *Attorney, Agent, or Firm* — The Ollila Law Group LLC

(57) ABSTRACT

A pneumatic actuator system (200) is provided according to the invention. The system (200) comprises a pneumatic actuator (100) including an actuator component (108), with the pneumatic actuator (100) being configured to include a first actuation phase and a second actuation phase. The system (200) further comprises one or more feedback sensors configured to provide one or more actuation feedback values, an actuator valve (213) coupled to and providing a first pneumatic pressure and a second pneumatic pressure to the pneumatic actuator (100), and a controller (240) coupled to the one or more feedback sensors and the actuator valve (213). The controller (240) is configured to receive the one or more actuation feedback values from the one or more feedback sensors and control the actuator valve (213) in order to actuate the actuator component (108) according to an actuation profile and according to the one or more actuation feedback values.

18 Claims, 10 Drawing Sheets

PNEUMATIC ACTUATOR SYSTEM AND METHOD

BACKGROUND OF THE INVENTION

1. Field of the Invention

The present invention relates to a pneumatic actuator, and more particularly, to a pneumatic actuator system and method.

2. Statement of the Problem

An actuator is a device that performs some mechanical action. One actuator is a piston, wherein a plunger of the piston moves in a reciprocating manner. The plunger can therefore be connected to some manner of work piece or other mechanical system.

In some actuator applications, it is desirable to have more than one actuation speed and/or more than one actuation force over the range of motion of the actuator. For example, in a spot welder machine, a pair of welding jaws must be brought together onto a work piece during a welding operation. The jaws must clamp onto the work piece with a desired force. Therefore, at the end of a clamping motion range, a relatively high actuation force must be provided to the welding jaws.

However, an actuator that provides a high level of force typically provides a relatively small range of actuation travel. This can be a problem where the jaws of the spot welder machine must open wide in order to be positioned on the work piece. Therefore, a jaw actuator of the spot welder machine needs to move relatively rapidly during a first actuation span and a large force is not required. During the second actuation span, the jaws need to move only a small distance, but must be able to provide a large clamping force.

An actuator for a machine typically requires precise control, with a minimum of slop. The need may be greater for a two-phase actuator having a first actuation phase followed by a second actuation phase, wherein the first actuation phase covers a greater actuation span at a greater speed but offers less force. The subsequent second actuation phase has a small actuation span and a lesser speed but offers a greater actuation force.

However, there are many other machines or devices that employ pneumatic actuators. Consequently, there is a need to flexibly control an actuation speed, force, and/or distance. There may additionally be a need to implement a custom actuation profile.

In addition, in a machine that includes an actuator, the machine will inevitably wear and degrade over time. This will lead to increased resistance in the machine. Therefore, there is a need for an actuator that can compensate for wear or other changes in operational conditions.

SUMMARY OF THE INVENTION

A pneumatic actuator system is provided according to an embodiment of the invention. The pneumatic actuator system comprises a pneumatic actuator including an actuator component, with the pneumatic actuator being configured to include a first actuation phase and a second actuation phase. The pneumatic actuator system further comprises one or more feedback sensors configured to provide one or more actuation feedback values, an actuator valve coupled to and providing a first pneumatic pressure and a second pneumatic pressure to the pneumatic actuator, and a controller coupled to the one or more feedback sensors and the actuator valve. The controller is configured to receive the one or more actuation feedback values from the one or more feedback sensors and control the actuator valve in order to actuate the actuator component according to an actuation profile and according to the one or more actuation feedback values.

An actuation method for a pneumatic actuator system comprising a pneumatic actuator including an actuator component is provided according to an embodiment of the invention. The method comprises receiving one or more actuation feedback values related to movement of the actuator component and actuating the actuator component according to an actuation profile and according to the one or more actuation feedback values.

An actuation method for a pneumatic actuator system comprising a pneumatic actuator including an actuator component is provided according to an embodiment of the invention. The method comprises receiving a displacement signal corresponding to a displacement of an actuator component of the pneumatic actuator. The method further comprises calculating a calculated actuation force value from a first pressure signal and a second pressure signal. The first pressure signal corresponds to a first pneumatic pressure in a pneumatic portion of the piston assembly and the second pressure signal corresponds to a second pneumatic pressure in a hydraulic force-multiplier portion. The method further comprises receiving a measured actuation force value from a force sensor. The measured actuation force value comprises a measurement of an actuation force generated by the piston assembly. The method further comprises actuating the actuator component according to an actuation profile and according to the displacement signal, the calculated actuation force value, and the measured actuation force value.

An actuation method for a pneumatic actuator system comprising a pneumatic actuator including an actuator component is provided according to an embodiment of the invention. The method comprises receiving a displacement signal corresponding to a displacement of an actuator component of the pneumatic actuator. The method further comprises calculating a calculated actuation force value from a first pressure signal and a second pressure signal. The first pressure signal corresponds to a first pneumatic pressure in a pneumatic portion of the piston assembly and the second pressure signal corresponds to a second pneumatic pressure in a hydraulic force-multiplier portion. The method further comprises receiving a measured actuation force value from a force sensor. The measured actuation force value comprises a measurement of an actuation force generated by the piston assembly. The method further comprises actuating the actuator component according to an actuation profile and according to the displacement signal, the calculated actuation force value, and the measured actuation force value. The method further comprises modifying an actuation profile in order to keep the calculated actuation force value within a predetermined tolerance of the measured actuation force value.

ASPECTS OF THE INVENTION

In one aspect of the system, the one or more feedback sensors comprises a displacement sensor configured to generate a displacement signal corresponding to a displacement of the actuator component, with the controller actuating the actuator component according to the actuation profile and according to the displacement signal.

In another aspect of the system, the one or more feedback sensors comprises a force sensor configured to generate a measured actuation force value, with the controller actuating the actuator component according to the actuation profile and according to the measured actuation force value.

In yet another aspect of the system, the one or more feedback sensors comprises a first pressure sensor configured to generate a first pressure signal corresponding to a first pneumatic pressure in a pneumatic portion of the pneumatic actuator, with the first pneumatic pressure moving the actuator component according to the first actuation phase, and a second pressure sensor configured to generate a second pressure signal corresponding to a second pneumatic pressure in a hydraulic force-multiplier portion of the pneumatic actuator, with the second pneumatic pressure moving the actuator component according to the second actuation phase and wherein a calculated actuation force value is derived from the first pressure signal and the second pressure signal and with the controller actuating the actuator component according to the actuation profile and according to the calculated actuation force value.

In yet another aspect of the system, the one or more feedback sensors comprises a displacement sensor configured to generate a displacement signal corresponding to a displacement of the actuator component, a force sensor configured to generate a measured actuation force value comprising a measurement of an actuation force generated by the actuator component, a first pressure sensor configured to generate a first pressure signal corresponding to a first pneumatic pressure in a pneumatic portion of the pneumatic actuator, with the first pneumatic pressure moving the actuator component according to the first actuation phase, and a second pressure sensor configured to generate a second pressure signal corresponding to a second pneumatic pressure in a hydraulic force-multiplier portion of the pneumatic actuator, with the second pneumatic pressure moving the actuator component according to the second actuation phase, wherein a calculated actuation force value is derived from the first pressure signal and the second pressure signal and with the controller actuating the actuator component according to the actuation profile and according to the measured actuation force value, the calculated actuation force value, and the displacement signal.

In yet another aspect of the system, the controller is further configured to modify the actuation profile in order to keep the calculated actuation force value within a predetermined tolerance of the measured actuation force value.

In yet another aspect of the system, the controller is further configured to modify the actuation profile in order to keep the calculated actuation force value within a predetermined tolerance of the measured actuation force value over an operational life of the pneumatic actuator system.

In yet another aspect of the system, a second stroke span of the second actuation phase is substantially smaller in length than a first stroke span of the first actuation phase.

In yet another aspect of the system, the first stroke span is traversed by the piston rod using a first actuation force and the second stroke span is traversed by the piston rod using a second actuation force that is substantially greater than the first actuation force.

In yet another aspect of the system, the second stroke span occurs at any point along the actuation span.

In yet another aspect of the system, the second stroke span is generated by a hydraulic force-multiplier portion of the actuator.

In one aspect of the method, the one or more actuation feedback values comprise a displacement signal received from a displacement sensor and corresponding to a displacement of the actuator component.

In another aspect of the method, the one or more actuation feedback values comprises a measured actuation force value received from a force sensor, with the measured actuation force value comprising a measurement of an actuation force generated by the actuator component.

In yet another aspect of the method, the one or more actuation feedback values comprises a calculated actuation force value generated from a first pressure signal and a second pressure signal, with the first pressure signal corresponding to a first pneumatic pressure in a pneumatic portion of the pneumatic actuator and with the second pressure signal corresponding to a second pneumatic pressure in a hydraulic force-multiplier portion.

In yet another aspect of the method, the one or more actuation feedback values comprises a displacement signal received from a displacement sensor and corresponding to a displacement of the actuator component, a measured actuation force value received from a force sensor, with the measured actuation force value comprising a measurement of an actuation force generated by the pneumatic actuator, and a calculated actuation force value generated from a first pressure signal and a second pressure signal, with the first pressure signal corresponding to a first pneumatic pressure in a pneumatic portion of the pneumatic actuator and with the second pressure signal corresponding to a second pneumatic pressure in a hydraulic force-multiplier portion.

In yet another aspect of the method, the method further comprises modifying an actuation profile in order to keep the calculated actuation force value within a predetermined tolerance of the measured actuation force value.

In yet another aspect of the method, the method further comprises modifying an actuation profile in order to keep the calculated actuation force value within a predetermined tolerance of the measured actuation force value over an operational life of the pneumatic actuator system.

DESCRIPTION OF THE DRAWINGS

The same reference number represents the same element on all drawings. It should be understood that the drawings are not necessarily to scale.

DETAILED DESCRIPTION OF THE INVENTION

FIGS. 1-12 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
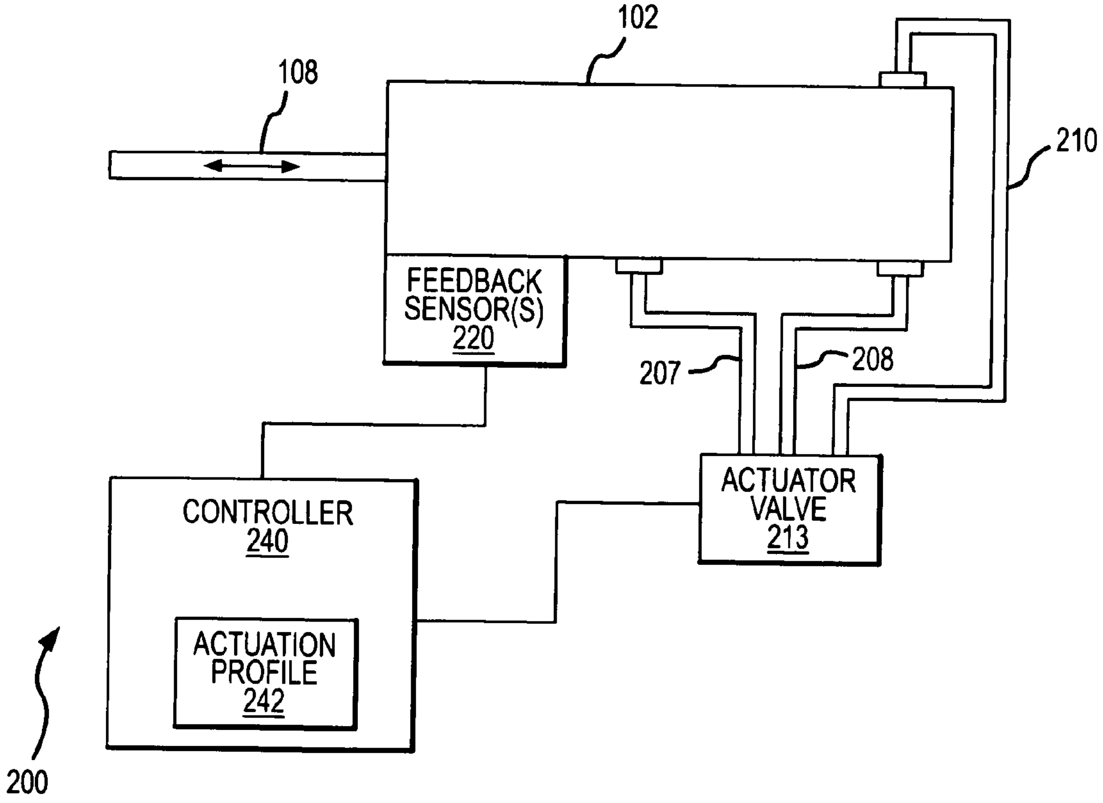
FIG. 1 shows a pneumatic actuator system according to an embodiment of the invention.

FIG. 1 shows a pneumatic actuator system 200 according to an embodiment of the invention. The pneumatic actuator system 200 includes a pneumatic actuator 100 comprising an actuator cylinder 102 including an actuator component 108 that moves in response to pneumatic air supplied to the actuator cylinder 102. In the embodiment shown, the actuator component 108 comprises a rod that is extended from and retracted into the actuator cylinder 102. Alternatively, in other embodiments the actuator component 108 can comprise a carriage that moves relative to an external surface of the actuator cylinder 102, i.e., the pneumatic actuator 100 comprises a rodless-type cylinder. The pneumatic actuator system 200 further includes first, second, and third conduits 207, 208, and 210, an actuator valve 213, one or more feedback sensors 220, and a controller 240. Components in common with other embodiments share reference numbers.

The actuator cylinder 102 receives a first pneumatic air supply from the actuator valve 213 via the first conduit 207 and receives a second pneumatic air supply from the actuator valve 213 via the second conduit 208. The internal components of the actuator cylinder 102 are discussed in detail below in conjunction with FIGS. 8-12.

The actuator valve 213 can comprise a valve system including one or more valves that is connected to some manner of pneumatic air supply. The actuator valve 213 selectively supplies pressurized pneumatic air to the first, second, and third conduits 207, 208, and 210. The actuator valve 213 can selectively supply pressurized pneumatic air to the first and/or second conduits 207 and 208 in order to actuate the actuator cylinder 102 and extend the actuator component 108. The actuator valve 213 can supply pressurized pneumatic air to the first conduit 207 in order to accomplish a first actuation phase. The actuator valve 213 can supply pressurized pneumatic air to the second conduit 208 in order to accomplish a second actuation phase. The actuator valve 213 can supply pressurized pneumatic air to the third conduit 210 in order to retract the actuator component 108.

The first actuation phase comprises an actuation accomplished through pneumatic air supplied to the first conduit 207 and the second actuation phase comprises an actuation accomplished through pneumatic air supplied to the second conduit 208. The first and second actuation phases can be performed singly or in combination. The first and second actuation phases can be performed at any time and in any order, including substantially simultaneously. When both the first and second actuation phases are performed simultaneously, the actuation component 108 can be moved according to a third phase. In addition, other actuation phases can be achieved, such as by varying the pressure of air supplied to the first and second conduits 207 and 208. An actuation profile 242, discussed below, can be used to specify any desired number of actuation occurrences, any desired actuation length, and any desired actuation speed and force.

The controller 240 regulates the actuation of the pneumatic actuator system 200. The controller 240 is coupled to the one or more feedback sensors 220 and to the actuator valve 213. The controller 240 controls the operation of the actuator valve 213 in order to control the operation of the actuator cylinder 102. In some embodiments the controller 240 can receive valve feedback information from the actuator valve 213.

The controller 240 receives one or more actuation feedback values from the one or more feedback sensors 220. The one or more feedback sensors 220 can comprise any manner of feedback sensors related to motion of the actuator component 108 (see FIG. 3 and the accompanying discussion). The one or more actuation feedback values are used by the controller 240 to control actuation of the actuator component 108.

Figure 2:
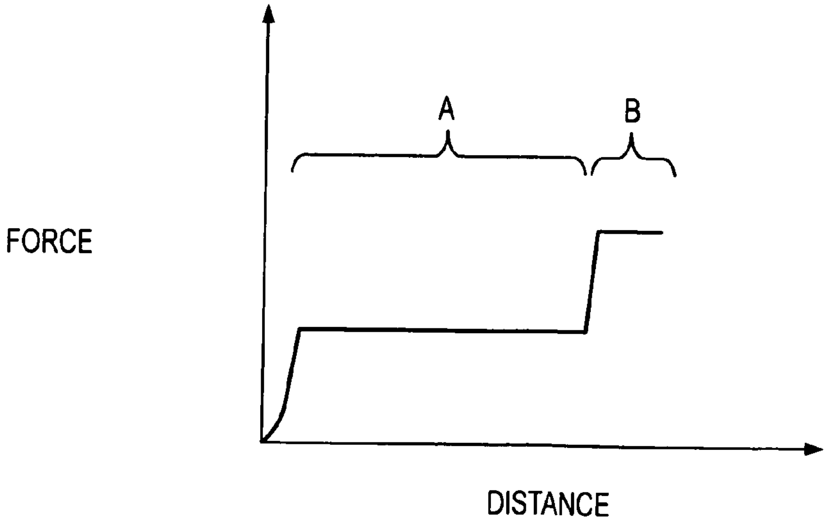
FIG. 2 is a graph showing an example actuation profile.

The controller 240 can perform and regulate actuations according to an actuation profile 242 (see FIG. 2 and the accompanying discussion). An actuation profile 242 can specify actuation speeds, actuation distances, and actuation forces, for example. An actuation profile 242 can comprise a specific set (and combination) of actuation speeds, distances, and forces. The controller 240 can include a storage that stores a computer program and that stores one or more actuation profiles 242. The controller 240 can perform and regulate actuations according to an actuation profile 242 and according to one or more actuation feedback values received from the one or more feedback sensors 220.

The first pneumatic air supply in some embodiments is used for a relatively low-force, relatively high actuation speed first actuation phase of the pneumatic actuator system 200. The second pneumatic air supply in some embodiments is used for a relatively high-force, relatively low actuation speed second actuation phase. The two actuation phases can occur at any time and in any order. The actuator cylinder 102 receives a third pneumatic air supply from the actuator valve 213 via the third conduit 210. The third pneumatic air supply in some embodiments is used to retract the actuator component 108.

One improvement over the prior art is in a required pneumatic pressure. Advantageously, the first and second pneumatic air supplies can supply a relatively low pressure to the pneumatic actuator system 200. In addition, the first and second pneumatic air supplies can supply a relatively low air volume.

A two-stage actuator of the prior art requires 10-12 bars of pneumatic pressure to perform the actuation of an actuator component. In contrast, the pneumatic actuator system 200 of the present invention requires only about 6 bars of pneumatic pressure. It should be understood that more pressure can be supplied, as needed. However, generating higher pressures and higher volumes of pneumatic air requires more energy and therefore a higher cost. The pneumatic actuator system 200 therefore provides a lower operational cost.

Another improvement over the prior art is in size. The pneumatic actuator system 200 achieves this low pressure, low volume performance while reducing a cross-sectional size of the pneumatic actuator system 200. For example, a prior art pneumatic actuator using 10-12 bars of pneumatic pressure typically has a cross-sectional dimension of about 160-200 millimeters (mm). In contrast, the pneumatic actuator system 200 can achieve such low pressure, low volume actuation with a cross-sectional size of about 63 mm. The pneumatic actuator system 200 therefore can provide an equivalent actuator having a smaller size and lower material and manufacturing costs.

FIG. 2 is a graph showing an example actuation profile. The actuation profile can comprise unique combinations of actuator speed and force values. In the graph, the portion A shows an actuation performed at a relatively low force but over a large distance. This actuation may be relatively fast. The portion B of the graph shows an actuation that covers a small actuation distance but at a higher force level. This portion may be at a lower actuation speed.

However it to be understood that this is just one actuation profile example and others are contemplated. In addition, it should be understood that the actuation profile can be designed for a particular application. The actuation profile in this example may be designed for the jaws or tongs of a spot welding machine, for example.

Figure 3:
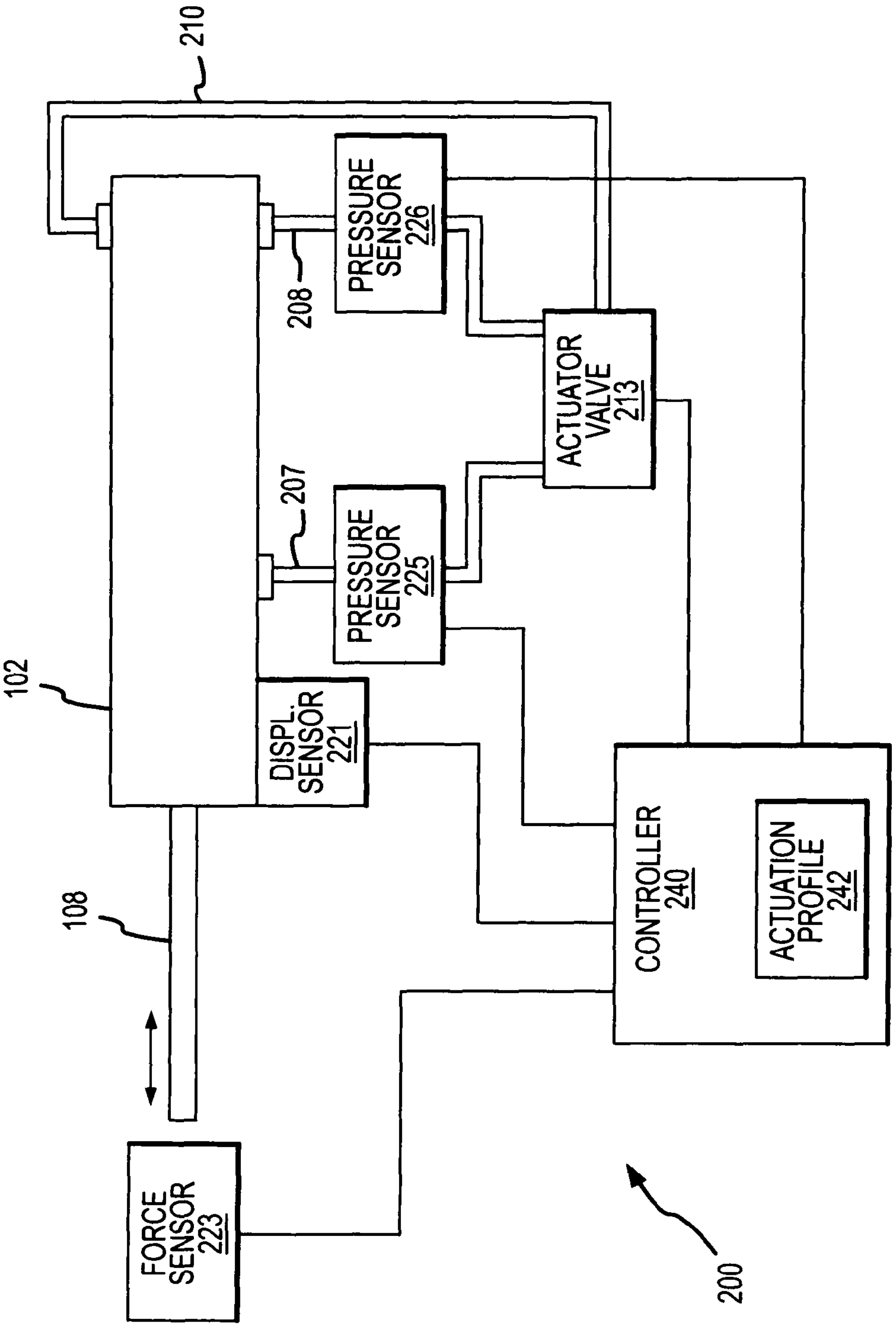
FIG. 3 shows a pneumatic actuator system according to an embodiment of the invention.

FIG. 3 shows a pneumatic actuator system 200 according to an embodiment of the invention. In this embodiment, the one or more feedback sensors 220 comprise a displacement sensor 221, a force sensor 223, a first pressure sensor 225, and a second pressure sensor 226. The controller 240 is electrically coupled to the displacement sensor 221, to the force sensor 223, to the first pressure sensor 225, and to the second pressure sensor 226. The controller 240 receives a displacement signal from the displacement sensor 221. The controller 240 receives a force signal from the force sensor 223. The controller 240 receives a first pressure signal from the first pressure sensor 225 and receives a second pressure signal from the second pressure sensor 226.

The displacement signal received by the controller 240 indicates a displacement (i.e., a relative position) of the actuator component 108. The controller 240 can therefore use the displacement signal to control the position and speed of the actuator component 108 as the actuator component 108 moves in and out of the actuator cylinder 102.

The measured actuation force value received by the controller 240 indicates an actuation force being generated by the actuator component 108. The force sensor 223 is an optional component and may or may not be present in the pneumatic actuator system 200. The controller 240 can use the measured actuation force value to determine an actual force applied to a work piece or work device acted on by the actuator component 108.

The first and second pressure sensors 225 and 226 can be located in the first and second conduits 207 and 208. Alternatively the first and second pressure sensors 225 and 226 can be located in appropriate regions of the actuator valve 213 or the actuator cylinder 102. The first and second pressure sensors 225 and 226 measure a first pneumatic pressure and a second pneumatic pressure employed to actuate the actuator component 108. The first pressure sensor 225 measures a first pneumatic pressure of pressurized air supplied to a purely pneumatic piston in the actuator cylinder 102 and generates a first pressure signal. The second pressure sensor 226 measure a second pneumatic pressure of pressurized air supplied to a hydraulic force-multiplier portion in the actuator cylinder 102 and generates a resulting second pressure signal. Hydraulic is defined herein to include any operation or movement of a component through a force of a supplied liquid. The liquid can comprise a substantially non-compressible liquid.

The force generated by the actuator component 108 due to the first pneumatic pressure can be calculated as the first pneumatic pressure multiplied by the active area of the purely pneumatic piston to produce a calculated actuation force value. The force generated by the actuator component 108 can be calculated as the second pneumatic pressure multiplied by the active area of the hydraulic force-multiplier portion to produce the calculated actuation force value. If both the first pneumatic pressure and the second pneumatic pressure are being supplied at the same time, then the calculated actuation force value comprises the sum of the force generated by the first pneumatic pressure plus the force generated by the second pneumatic pressure.

It should be understood that the actuation force value thus derived from the first pressure signal supplied from the first pressure sensor 225 and the second pressure signal supplied from the second pressure sensor 226 will closely track the actual force generated by the actuator component 108. Therefore, the calculated actuation force value may render the force sensor 223 unnecessary.

However, at times the calculated actuation force value may deviate from the measured actuation force value generated by the force sensor 223. This may be due to the size, weight, and/or geometry of a working piece or working mechanism that is actuated by the actuator component 108 (i.e., some of the force supplied by the pneumatic air pressure is absorbed by either the pneumatic actuator 100 or by a working mechanism). The difference in force values may be caused by frictional forces and wear in various components of the pneumatic actuator system 200, for example. As a result, over time, the calculated actuation force value may drift away from the measured actuation force value, as measured by the force sensor 223. However, the controller 240 can track any such deviation and can use any deviation to determine whether and when the controller 240 may adjust operation of the actuator valve 213 in order to compensate. As a result, the controller 240 can adjust a first pneumatic pressure supplied to the actuator cylinder 102 in order to maintain a desired actuator component force. Therefore, the controller 240 can be configured to modify an actuation profile 242 in order to keep the calculated actuation force value within a predetermined tolerance of the measured actuation force value. Further, the controller 240 can be configured to modify an actuation profile 242 in order to keep the calculated actuation force value within a predetermined tolerance of the measured actuation force value over an operational life of the pneumatic actuator system 200.

Figure 4:
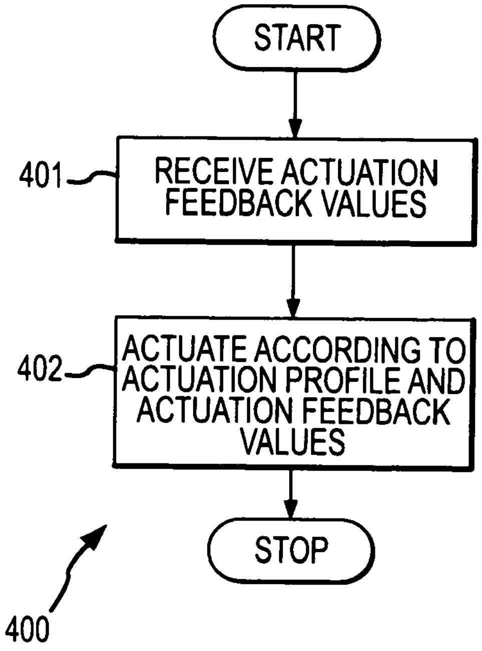
FIG. 4 is a flowchart of an actuation method for a pneumatic actuator system comprising a pneumatic actuator including an actuator component according to an embodiment of the invention.

FIG. 4 is a flowchart 400 of an actuation method for a pneumatic actuator system comprising a pneumatic actuator including an actuator component according to an embodiment of the invention. In step 401, one or more actuation feedback values are received. The feedback values can comprise any actuation feedback values. In some embodiments, the actuation feedback values can comprise an actuation speed. In some embodiments, the actuation feedback values can comprise an actuation span or distance. In some embodiments, the actuation feedback values can comprise an actuation force. In some embodiments, the actuation feedback values can comprise one or more pneumatic pressures. However, it should be understood that other feedback values are contemplated and are within the scope of the description and claims.

In step 402, the pneumatic actuator can be actuated according to an actuation profile and according to the one or more actuation feedback values. The feedback values combined with the actuation profile can be used to determine the control actions taken with regard to the pneumatic actuator.

Figure 5:
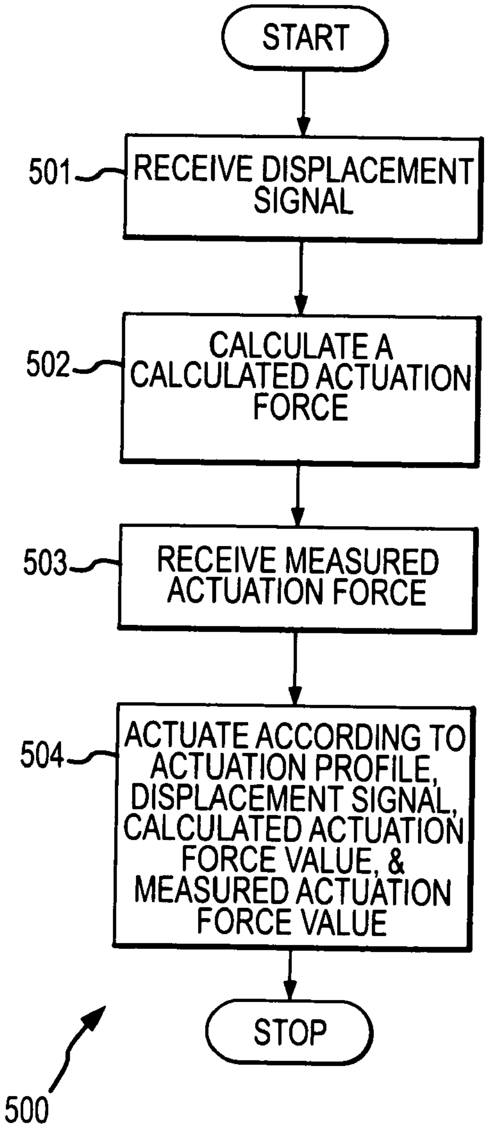
FIG. 5 is a flowchart of an actuation method for a pneumatic actuator system comprising a pneumatic actuator including an actuator component according to an embodiment of the invention.

FIG. 5 is a flowchart 500 of an actuation method for a pneumatic actuator system comprising a pneumatic actuator including an actuator component according to an embodiment of the invention. In step 501, a displacement signal is received. The displacement signal corresponds to a displacement of an actuator component of the pneumatic actuator.

In step 502, a calculated actuation force value is calculated from a first pressure signal and a second pressure signal. The first pressure signal corresponds to a first pneumatic pressure in a pneumatic portion of the pneumatic actuator. The second pressure signal corresponds to a second pneumatic pressure in a hydraulic force-multiplier portion of the pneumatic actuator.

In step 503, a measured actuation force value is received. The measured actuation force value can be received from a force sensor, for example. In some embodiments, the measured actuation force value can be measured as a force exerted by the actuator component, for example.

In step 504, the pneumatic actuator can be actuated according to an actuation profile and according to the displacement signal, the calculated actuation force value, and the measured actuation force value. The displacement signal, the calculated actuation force value, and the measured actuation force value, combined with the actuation profile, can be used to determine the control actions taken with regard to the pneumatic actuator.

Figure 6:
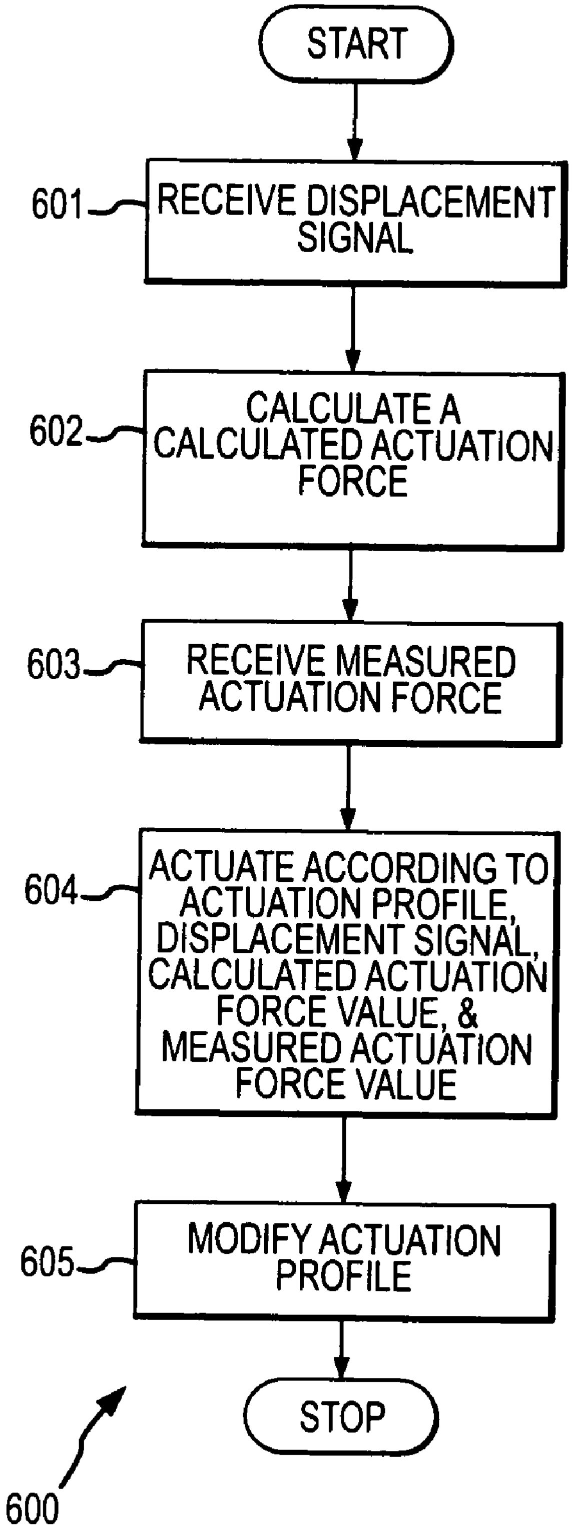
FIG. 6 is a flowchart of an actuation method for a pneumatic actuator system comprising a pneumatic actuator including an actuator component according to an embodiment of the invention.

FIG. 6 is a flowchart 600 of an actuation method for a pneumatic actuator system comprising a pneumatic actuator including an actuator component according to an embodiment of the invention. In step 601, a displacement signal is received, as previously discussed.

In step 602, a calculated actuation force value is calculated, as previously discussed.

In step 603, a measured actuation force value is received, as previously discussed.

In step 604, as previously discussed, the pneumatic actuator can be actuated according to an actuation profile and according to the displacement signal, the calculated actuation force value, and the measured actuation force value.

In step 605, the actuation profile can be modified. The actuation profile can be modified in order to ensure a continuing accuracy of the calculated actuation force value. The modification can be triggered if the difference between the calculated actuation force value and the measured actuation force value exceeds a predetermined tolerance. The actuation profile can be modified in order to keep the calculated actuation force value within a predetermined tolerance of the measured actuation force value. The actuation profile can be modified in order to keep the calculated actuation force value within a predetermined tolerance of the measured actuation force value over an operational life of the pneumatic actuator system.

Figure 7:
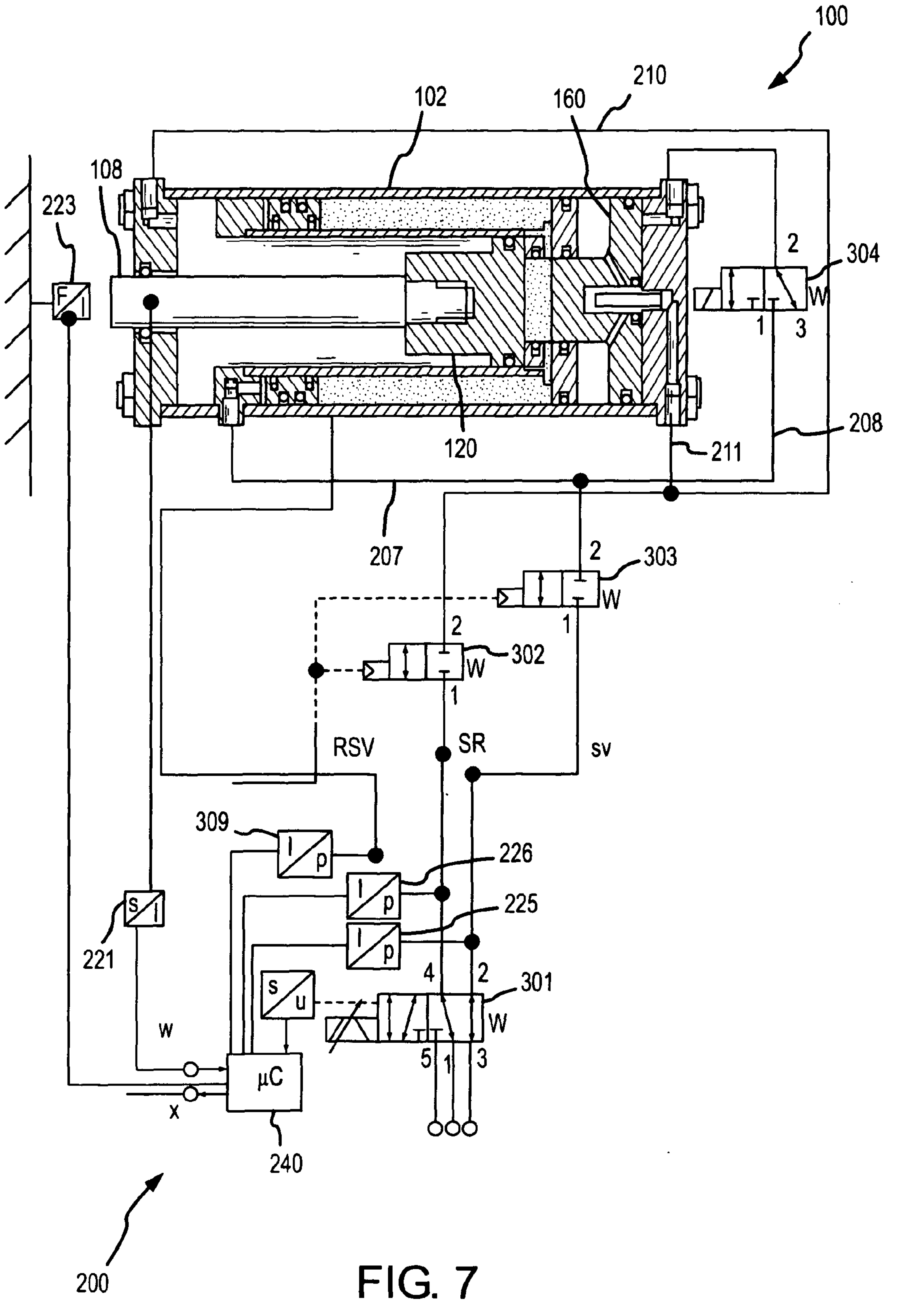
FIG. 7 shows a pneumatic actuator system according to an embodiment of the invention.

FIG. 7 shows a pneumatic actuator system 200 according to an embodiment of the invention. In this embodiment, the valves 301, 302, 303, and 304 implement the actuator valve 213 of the previous figures. Valve 301 comprises a 5/3 (5 port, 3-way) solenoid actuated proportional valve. Valve 301 is coupled to a pneumatic air supply. Valve 302 comprises a 2/2 pneumatic pilot actuated valve. Valve 302 is connected to the valve 301 and is further connected to the a third conduit 210 and a fourth conduit 211. Valve 303 comprises a 2/2 pneumatic pilot actuated valve. Valve 303 is likewise connected to the valve 301 and is further connected to a first conduit 207 and a second conduit 208. Valve 304 comprises a 2/3 solenoid actuated valve. Valve 304 is connected inline in the second conduit 208. The valves 301 and 304 are electrically controlled by the controller (μC) 240. The valves 302 and 303 are controlled by a pilot air supply.

Port 1 of the valve 301 receives the pneumatic pressurized air from the air supply. Port 1 can be selectively connected to either port 2 or port 4 of the valve 301. The valve 301 therefore selectively provides pneumatic air to the valve 302 and the valve 303. The valve 303 selectively provides pneumatic air to the valve 304.

When the pneumatic air from the air supply is connected to port 4 of the valve 301, as shown in the figure, and if the valve 302 is actuated, then pressurized air is supplied to both the third conduit 210 and the fourth conduit 211. As a result, the pressurized air from the fourth conduit 211 will move the ram 160 to the right in the figure and will retract the ram 160 while the pressurized air from the third conduit 210 will move the piston 120 to the right in the figure and will retract the piston 120 (see FIGS. 10-12 and the accompanying discussion). In this configuration, the ram 160 will be substantially fully retracted before the piston 120 is retracted. Alternatively, the valve 302 could direct pneumatic air to either the second conduit 208 or the third conduit 210 in a predetermined retraction sequence.

Conversely, when the pneumatic air from the air supply is connected to port 2 of the valve 301, and the valve 303 is actuated, then pressurized air is supplied to both the first conduit 207 and to the second conduit 208. The first conduit 207 is coupled to a pneumatic portion of the pneumatic actuator 100, while the second conduit 208 is coupled to a hydraulic force-multiplier portion. Pressurized air supplied to the first conduit 207 will move the piston 120 to the left in the figure and will extend the piston 120. However, the second conduit 208 is further controlled by the valve 304. In some embodiments, when the piston 120 is substantially fully extended by the pneumatic portion via the first conduit 207, then the valve 304 can be actuated and pressurized air is supplied to the second conduit 208. The pressurized air supplied by the second conduit 208 actuates the hydraulic force-multiplier portion and the ram 160 is moved to the left in the figure. When the valve 304 is not actuated, then the valve 304 exhausts air to the right of the ram 160, allowing the ram 160 to be retracted.

The first pressure sensor 225 is in communication with port 2 of the valve 301 and generates the first pressure signal. The second pressure sensor 226 is in communication with port 4 of the valve 301 and generates the second pressure signal. Both the first pressure sensor 225 and the second pressure sensor 226 are electrically coupled to the controller (μC) 240.

In the embodiment shown, a third pressure sensor 309 can be included. The third pressure sensor measures a hydraulic fluid pressure of the hydraulic force-multiplier portion. The third pressure sensor is also electrically coupled to the controller (μC) 240.

This embodiment further includes the displacement sensor 221 and the force sensor 223. Both the displacement sensor 221 and the force sensor 223 are electrically coupled to the controller (μC) 240.

Figure 8:
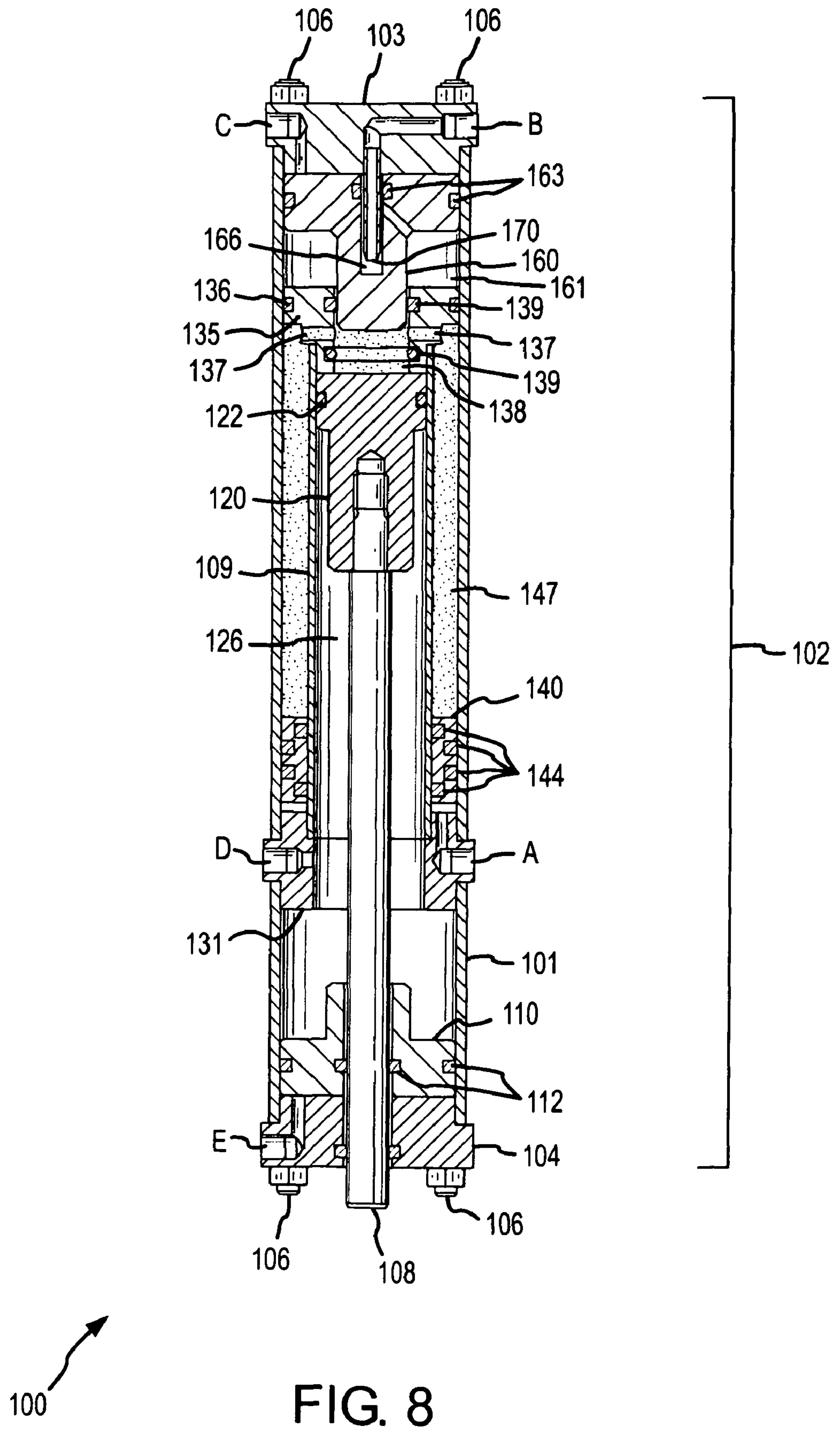
FIG. 8 shows a pneumatic actuator according to an embodiment of the invention.

FIG. 8 shows a pneumatic actuator 100 according to an embodiment of the invention. The figure comprises a section view approximately along a center of the actuator 100, showing internal components. The actuator 100 includes an actuator body 102 and a piston rod 108 extending out of the actuator body 102. The actuator body 102 in one embodiment comprises an outer shell 101, a top plug 103, a bottom plug 104, and one or more fasteners 106 that hold the top plug 103 and the bottom plug 104 in the outer shell 101. The piston rod 108 movably extends from the bottom plug 104, with the piston rod 108 configured to be extended and retracted. The extension and retraction of the piston rod 108 can perform mechanical work and the piston rod 108 can be coupled to any manner of mechanical device. The pneumatic actuator 100 can extend and retract the piston rod 108 according to selective introduction of a pressurized gas, such as pressurized air.

Figure 9A:
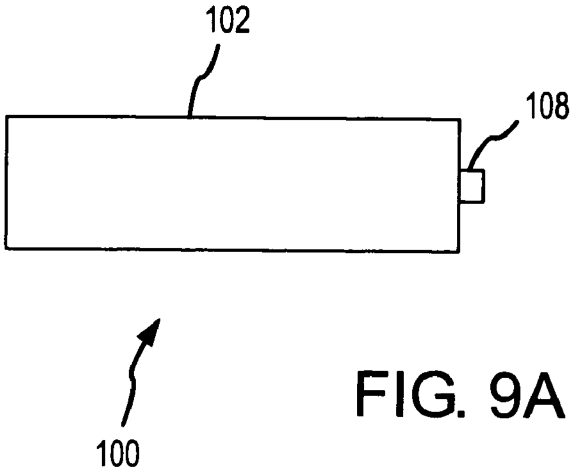
FIGS. 9A-9C show the actuator in different extension positions.
Figure 9B:
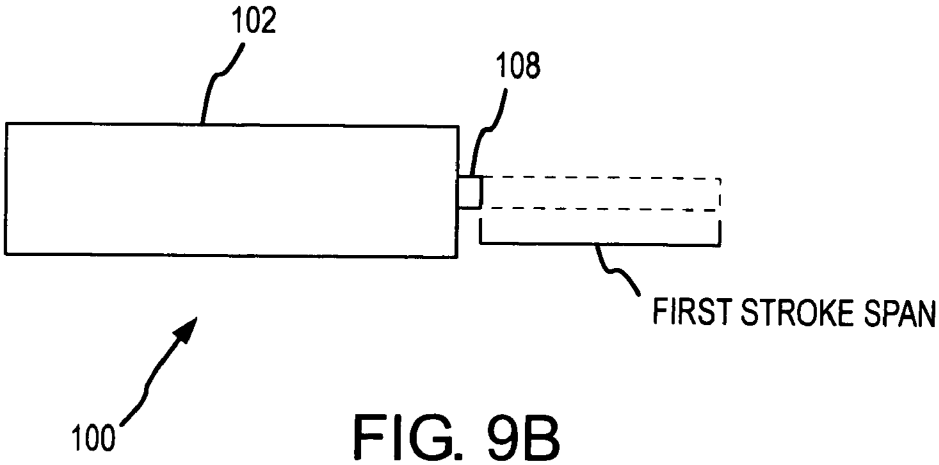
Figure 9C:
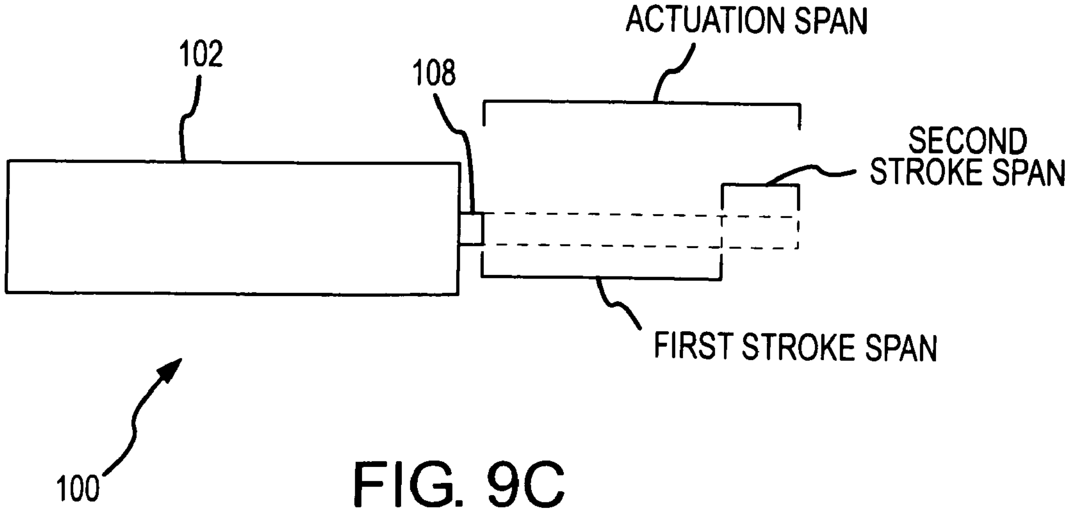

FIGS. 9A-9C show the actuator 100 in different extension positions. The actuator 100 in one embodiment comprises a three-position actuator. In FIG. 9A, the piston rod 108 is fully retracted. In FIG. 9B, the piston rod 108 is extended to a first stroke span. In FIG. 9C, the piston rod 108 is fully extended over an actuation (i.e., full stroke) span. The actuation span therefore comprises the first stroke span plus a second stroke span. The second stroke span can differ from the first stroke span. For example, the second stroke span can be substantially smaller in length than the first stroke span. This is desirable when actuating a mechanical device that requires a large actuation span followed by a small actuation span, or vice versa.

The first stroke span can be traversed at a first actuation speed and the second stroke span can be traversed at a second actuation speed. In one embodiment, the second actuation speed is substantially slower than the first actuation speed.

The first stroke span can be traversed using a first actuation force and the second stroke span can be traversed using a second actuation force. In one embodiment, the second actuation force is substantially greater than the first actuation force.

The actuator 100 in one embodiment includes a force amplifier. In one embodiment, the actuator 100 includes a hydro-pneumatic force amplifier. The force amplifier can provide a force greater than a force generated by a supplied pneumatic pressure alone. The actuator 100 in one embodiment can provide a force amplifier at any point in the overall actuation span. The force amplifier can be actuated at a midpoint of the actuation span or can be actuated before or after the midpoint.

Referring again to FIG. 8, the actuator 100 further includes a piston 120 that reciprocally moves in a piston chamber 126. The piston 120 is connected to and moves the piston rod 108.

The actuator 100 further includes an inner shell 109, a lower inner plug 131, and an upper inner plug 135. The inner shell 109 forms the piston chamber 126. The lower inner plug 131 is located at a bottom region of the piston chamber 126 and the upper inner plug 135 is located at a top region of the piston chamber 126. In addition, the lower inner plug 131 and the upper inner plug 135 hold the inner shell 109 substantially in position within the outer shell 101. In one embodiment, the inner shell 109 is substantially coaxial with the outer shell 101. The upper inner plug 135 includes an upper inner plug seal(s) 136 that substantially seal the upper inner plug 135 to the outer shell 101. In addition, the upper inner plug 135 includes hydraulic fluid passages 137, a ram throat 138, and ram throat seals 139. The ram throat 138 receives a ram 160, with the ram throat seals 139 sealing the ram 138 to the upper inner plug 135. As a consequence, the ram 138 blocks the ram throat 138 and can move reciprocally up and down in the ram throat 138.

The actuator 100 further includes a piston ring 110. The piston ring 110 can include piston ring seals 112. The piston ring 110 can move with respect to the outer shell 101 and can move with respect to the piston rod 108. The piston ring 110 can move under influence of pressurized gas above and below the piston ring 110. The pressurized gas can be introduced and exhausted from above and below the piston ring 110 by port D and port E, respectively.

The actuator 100 further includes a movable ring 140 located in a ring chamber 147 formed between the inner shell 109 and the outer shell 102. The upper side of the movable ring 140 contacts a hydraulic fluid, which is also present in the piston chamber 126 above the piston 120. The movable ring 140 is configured to move reciprocally up and down between the outer shell 101 and the inner shell 109 in response to gas introduced and exhausted by port A. The movable ring 140 can include movable ring seals 144. The movable ring seals 144 substantially seal the movable ring 140 to the outer shell 101. In addition, the movable ring seals 144 substantially seal the movable ring 140 to the inner shell 109.

The actuator 100 further includes the ram 160. The ram 160 moves reciprocally up and down in a ram chamber 161. The ram 160 includes ram seals 163, a ram conduit(s) 163, and a ram filling cavity 166. The ram filling cavity 166 is fed pressurized gas by a pipe 170 that extends from the top plug 103 and that is connected to port B. The gas is transferred to a portion of the ram chamber 161 below the ram 160, with the gas traveling through the ram conduit(s) 163 to the portion of the ram chamber 161. In addition, the ram 160 is in communication with port C. As a result, the ram 160 can be moved down by introduction of pressurized gas into port C and can be moved up by introduction of pressurized gas into port B.

Upward movement of the movable ring 140 forces the piston 120 downward over a first stroke span due to movement of a first volume of the hydraulic fluid from the ring chamber 147 into the piston chamber 126. Downward movement of the ram 160 forces a second volume of the hydraulic fluid down into the piston chamber 126, wherein the downward movement of the ram 160 forces the piston 120 downward over a second stroke span.

The figure shows the actuator 100 in a fully retracted position, where the piston rod 108 is fully retracted within the actuator 100. Pressurized gas can be supplied into port D to move the piston 120 to (and hold the piston 120 in) the fully retracted position. Correspondingly, port A, port B, and port C are released in order to allow the piston 120 and the ram 160 to move to fully retracted upward positions. As the piston 120 is moved upwards, the hydraulic fluid above the piston 120 is moved out of the piston chamber 126 and is forced into the chamber between the outer shell 101 and the inner shell 109, pushing the movable ring 140 fully downward. As a result, gas is forced out of port A. In addition, port C is released and the gas between the ram 160 and the top plug 103 is not held. As a result, the upward movement of the piston 120 causes the ram 160 to move fully upward.

Figure 10:
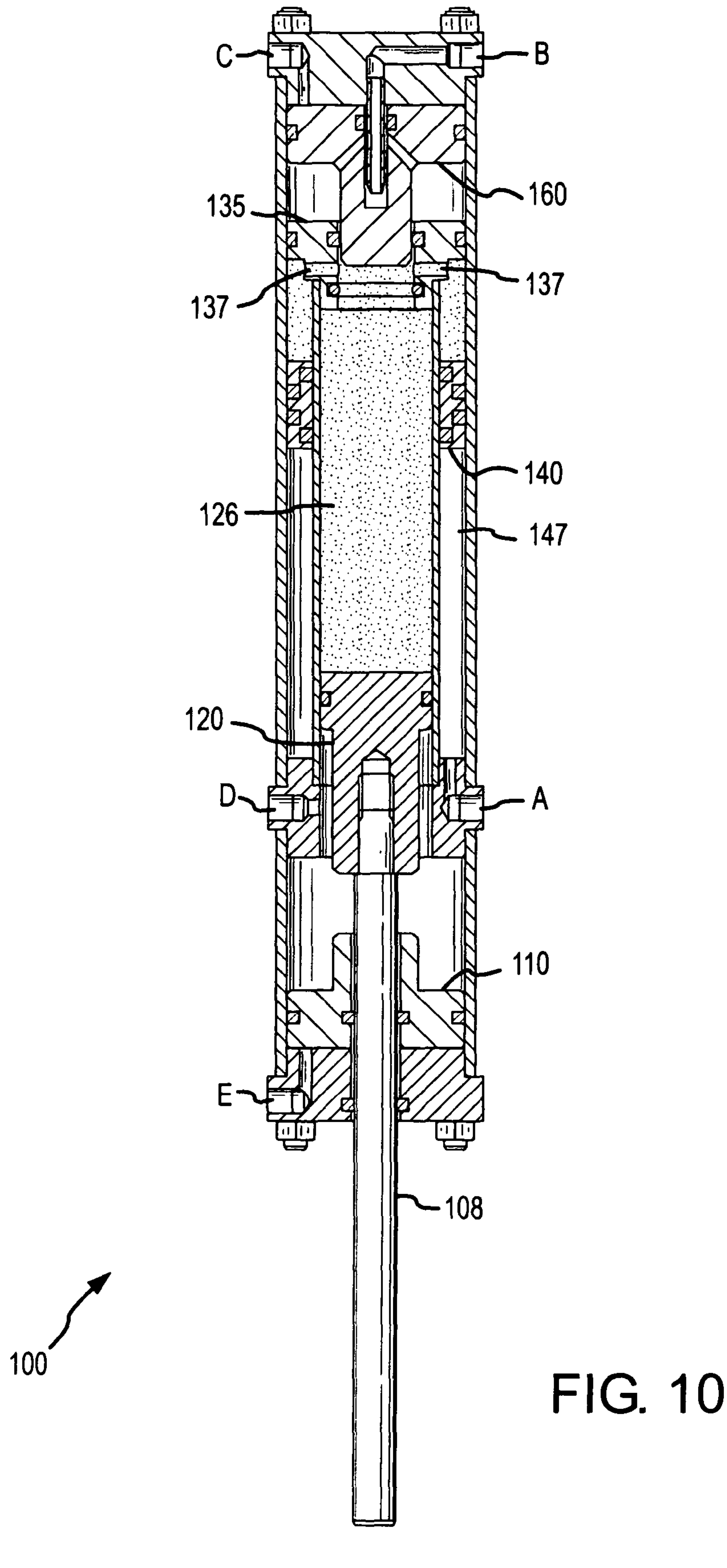
FIG. 10 shows the actuator in a partial actuation position.

FIG. 10 shows the actuator 100 in a partial actuation position. Gas has been supplied into port A, pushing the movable ring 140 upward. However, it should be noted that the movable ring 140 has not been moved to its upward limit. The upward movement of the movable ring 140 forces hydraulic fluid through the hydraulic fluid passage(s) 137 from the ring chamber 147 and into the piston chamber 126, moving the piston 120 partially down. Due to the larger diameter of the outer shell 101 and the consequent volume between the inner shell 109 and the outer shell 101, the movement of the movable ring 140 causes the piston 120 to move relatively rapidly downward (i.e., the first actuation speed). During downward movement of the piston 120, gas is released from the piston chamber 126 below the piston 120 via port D. The movement of the movable ring 140 therefore causes the piston 120 to move over the first (large) stroke span (see FIG. 9B).

Figure 11:
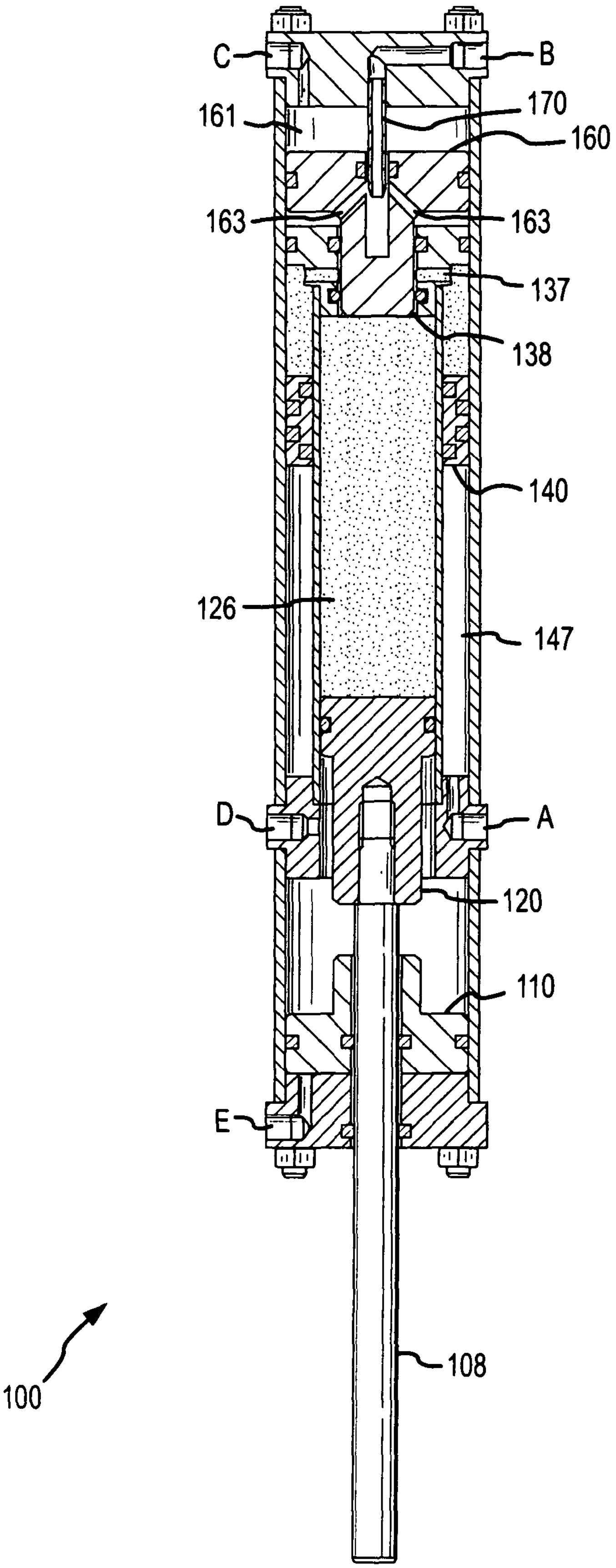
FIG. 11 shows the actuator when a force multiplier has been actuated.

FIG. 11 shows the actuator 100 when a force multiplier has been actuated. The force multiplier actuation causes the piston 120 to move over a second (small) stroke span (see FIG. 9B). However, it should be noted that the piston rod 108 is not fully extended in this figure, as the movable ring 140 is not in a fully upward position.

To actuate the force multiplier, port B is released, the pressure at port A is held, and pressurized gas is further supplied to port C. This moves the ram 160 downward in the ram chamber 161, moving the ram 160 fully into the ram throat 138. As a result, the ram 160 blocks off the hydraulic fluid passage(s) 137 and consequently seals the hydraulic fluid in the piston chamber 126. The volume of hydraulic fluid displaced by the ram 160 in the ram throat 138 causes the piston 120 to move additionally downward. The large cross-sectional area of the top of the ram 160, combined with the smaller cross-sectional area of the bottom of the ram 160, provides the force multiplier effect. The ram 160 presses the hydraulic fluid into the piston chamber 126. The force at the end of the ram 160 in one embodiment is about 6 times the force on the upper side of the ram 160. No additional hydraulic fluid needs to be provided to the actuator 100. The ram 160 therefore provides a large second actuation force over the second (small) stroke span.

It should be understood that the force multiplier can be actuated at any point in the first (large) stroke span. As a result, even if the piston rod 108 is only at a midpoint of the first stroke span, the ram 160 can be moved downward and the second (small) stroke span can be traversed by the piston rod 108, in addition to any portion of the first stroke span already traversed.

The retraction operation is essentially the opposite of the extension operation. For retraction, the pressurized gas at port A and port C is released. Subsequently, pressurized gas is supplied to port B, moving the ram 160 upward to a fully retracted position. The retraction of the ram 160 unblocks the hydraulic fluid passage(s) 137, allowing hydraulic fluid to move from the piston chamber 126 to the ring chamber 147. Then, pressurized gas is introduced to port E in order to force the piston ring 110 fully upward, thereby forcing the piston 120 partially upward (see FIG. 12 and the accompanying discussion below). Pressurized gas is then introduced to port D (while pressure is held at port E), with the pressurized gas at port D pushing the piston 120 fully upward and forcing the movable ring 140 fully downward. Therefore, the second (small) stroke span is retracted first and then the first (large) stroke span is retracted. Optionally, the pressurized gas at port E can then be released, allowing the piston ring 110 to drop down onto the bottom plug 104.

Figure 12:
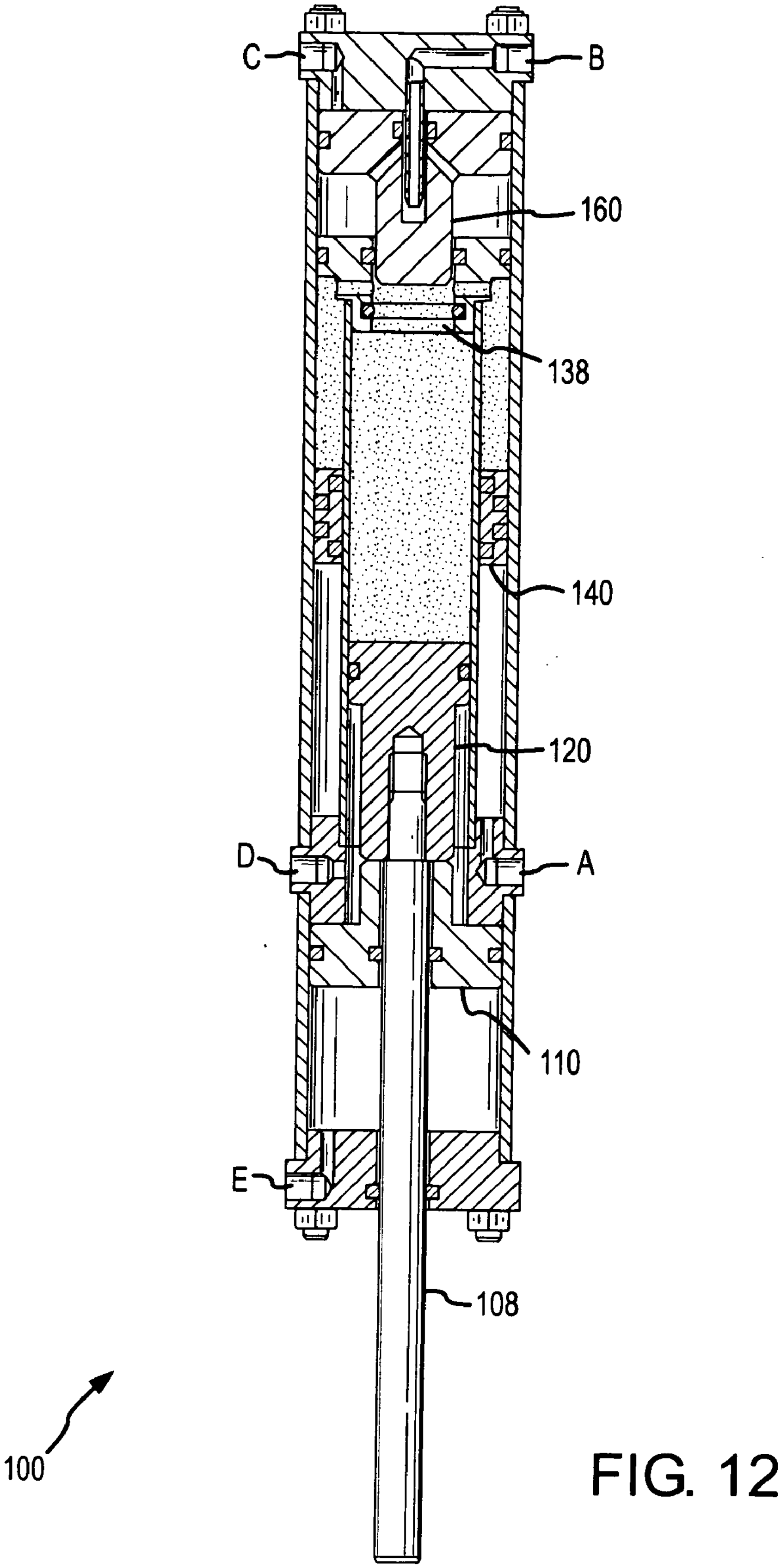
FIG. 12 shows the actuator after the force multiplier has been de-activated.

FIG. 12 shows the actuator 100 after the force multiplier has been de-activated. Here, port C has been released and pressurized gas has been supplied to port B. As a result of the pressurized gas at port B, the ram 160 has been moved upward, unblocking the ram throat 138 and the hydraulic fluid passage(s) 137. Hydraulic fluid can now pass from the piston chamber 126 to the ring chamber 147 via the hydraulic fluid passage(s) 137. In addition, port D remains released and pressurized gas has been supplied at port E. The pressurized gas at port E moves the piston ring 110 upward. The piston ring 110 comes into contact with the piston 120, forcing the piston 120 and the piston rod 108 upward. As a consequence, the piston 120 has moved back upward (i.e., retracted) over the second (small) stroke span, and at least partially over the first (large) stroke span. Consequently, the movable ring 140 has moved partially downward. At this point in the retraction sequence, pressurized gas can be maintained at port E and pressurized gas can now be supplied to port D, wherein the pressurized gas supplied to port D will cause the piston 120 to move fully upward and the piston rod 108 will traverse the large stroke span and fully retract.

What is claimed is:

1. A pneumatic actuator system (200) comprising a pneumatic actuator (100) including an actuator cylinder (102) and an actuator component (108), with the pneumatic actuator system (200) being characterized by:

- a first conduit (207) and a second conduit (208) coupled to the pneumatic actuator (100);
- one or more feedback sensors configured to provide one or more actuation feedback values, with the one or more actuation feedback values including a calculated actuation force value generated from a first pressure signal and a second pressure signal;
- an actuator valve (213) coupled to and providing a first pneumatic pressure to the first conduit (207) in a first actuation phase and providing a second pneumatic pressure to the second conduit (208) in a second actuation phase, wherein the second actuation phase is independent of the first actuation phase; and
- a controller (240) coupled to the one or more feedback sensors and the actuator valve (213), with the controller (240) configured to receive the one or more actuation feedback values from the one or more feedback sensors and control the actuator valve (213) in order to actuate the actuator component (108) according to an actuation profile, according to the one or more actuation feedback values including the calculated actuation force value, and according to the first actuation phase, the second actuation phase, or a combined first and second actuation phase.

2. The system (200) of claim 1, with the one or more feedback sensors comprising a displacement sensor (221) configured to generate a displacement signal corresponding to a displacement of the actuator component (108), with the controller (240) actuating the actuator component (108) according to the actuation profile and according to the displacement signal.

3. The system (200) of claim 1, with the one or more feedback sensors comprising a force sensor (223) configured to generate a measured actuation force value, with the controller (240) actuating the actuator component (108) according to the actuation profile and according to the measured actuation force value.

4. The system (200) of claim 1, with the one or more feedback sensors comprising:

- a first pressure sensor (225) configured to generate the first pressure signal corresponding to a first pneumatic pressure in a pneumatic portion of the pneumatic actuator (100), with the first pneumatic pressure moving the actuator component (108) according to the first actuation phase; and
- a second pressure sensor (226) configured to generate the second pressure signal corresponding to a second pneumatic pressure in a hydraulic force-multiplier portion of the pneumatic actuator (100), with the second pneumatic pressure moving the actuator component (108) according to the second actuation phase;

with the controller (240) actuating the actuator component (108) according to the actuation profile and according to the calculated actuation force value.

5. The system (200) of claim 1, with the one or more feedback sensors comprising:

- a displacement sensor (221) configured to generate a displacement signal corresponding to a displacement of the actuator component (108);
- a force sensor (223) configured to generate a measured actuation force value comprising a measurement of an actuation force generated by the actuator component (108);
- a first pressure sensor (225) configured to generate the first pressure signal corresponding to a first pneumatic pressure in a pneumatic portion of the pneumatic actuator (100), with the first pneumatic pressure moving the actuator component (108) according to the first actuation phase; and
- a second pressure sensor (226) configured to generate the second pressure signal corresponding to a second pneumatic pressure in a hydraulic force-multiplier portion of the pneumatic actuator (100), with the second pneumatic pressure moving the actuator component (108) according to the second actuation phase, with the controller (240) actuating the actuator component (108) according to the actuation profile and according to the measured actuation force value, the calculated actuation force value, and the displacement signal.

6. The system (200) of claim 5, with the controller (240) being further configured to modify the actuation profile in order to keep the calculated actuation force value within a predetermined tolerance of the measured actuation force value.

7. The system (200) of claim 5, with the controller (240) being further configured to modify the actuation profile in order to keep the calculated actuation force value within a predetermined tolerance of the measured actuation force value over an operational life of the pneumatic actuator system.

8. The system (200) of claim 1, with a second stroke span of the second actuation phase being substantially smaller in length than a first stroke span of the first actuation phase.

9. The system (200) of claim 8, with the first stroke span being traversed by the piston rod (108) using a first actuation force and with the second stroke span being traversed by the piston rod (108) using a second actuation force that is substantially greater than the first actuation force.

10. The system (200) of claim 8, with the second stroke span occurring at any point along the actuation span.

11. The system (200) of claim 8, with the second stroke span being generated by a hydraulic force-multiplier portion of the actuator (100).

12. An actuation method for a pneumatic actuator system comprising a pneumatic actuator including an actuator component, the method comprising:

receiving one or more actuation feedback values related to movement of the actuator component, with the one or more actuation feedback values including a calculated actuation force value generated from a first pressure signal and a second pressure signal; and actuating the actuator component according to an actuation profile and according to the one or more actuation feedback values including the calculated actuation force value, with the actuating comprising:

providing pneumatic air to a first conduit coupled to the pneumatic actuator in a first actuation phase;

providing the pneumatic air to a second conduit coupled to the pneumatic actuator in a second actuation phase; or providing the pneumatic air to both the first conduit and the second conduit in a combined first and second actuation phase.

13. The method of claim 12, with the one or more actuation feedback values comprising a displacement signal received from a displacement sensor and corresponding to a displacement of the actuator component.

14. The method of claim 12, with the one or more actuation feedback values comprising a measured actuation force value received from a force sensor, with the measured actuation force value comprising a measurement of an actuation force generated by the actuator component.

15. The method of claim 12, with the first pressure signal corresponding to a pneumatic pressure in a pneumatic portion of the pneumatic actuator and with the second pressure signal corresponding to a hydraulic pressure in a hydraulic force-multiplier portion.

16. The method of claim 12, with the one or more actuation feedback values comprising:

a displacement signal received from a displacement sensor and corresponding to a displacement of the actuator component;

a measured actuation force value received from a force sensor, with the measured actuation force value comprising a measurement of an actuation force generated by the pneumatic actuator; and the calculated actuation force value, with the first pressure signal corresponding to a first pneumatic pressure in a pneumatic portion of the pneumatic actuator and with the second pressure signal corresponding to a second pneumatic pressure in a hydraulic force-multiplier portion.

17. The method of claim 16, with the method further comprising modifying the actuation profile in order to keep the calculated actuation force value within a predetermined tolerance of the measured actuation force value.

18. The method of claim 16, with the method further comprising modifying the actuation profile in order to keep the calculated actuation force value within a predetermined tolerance of the measured actuation force value over an operational life of the pneumatic actuator system.

* * * * *